UNITED STATES PATENT OFFICE.

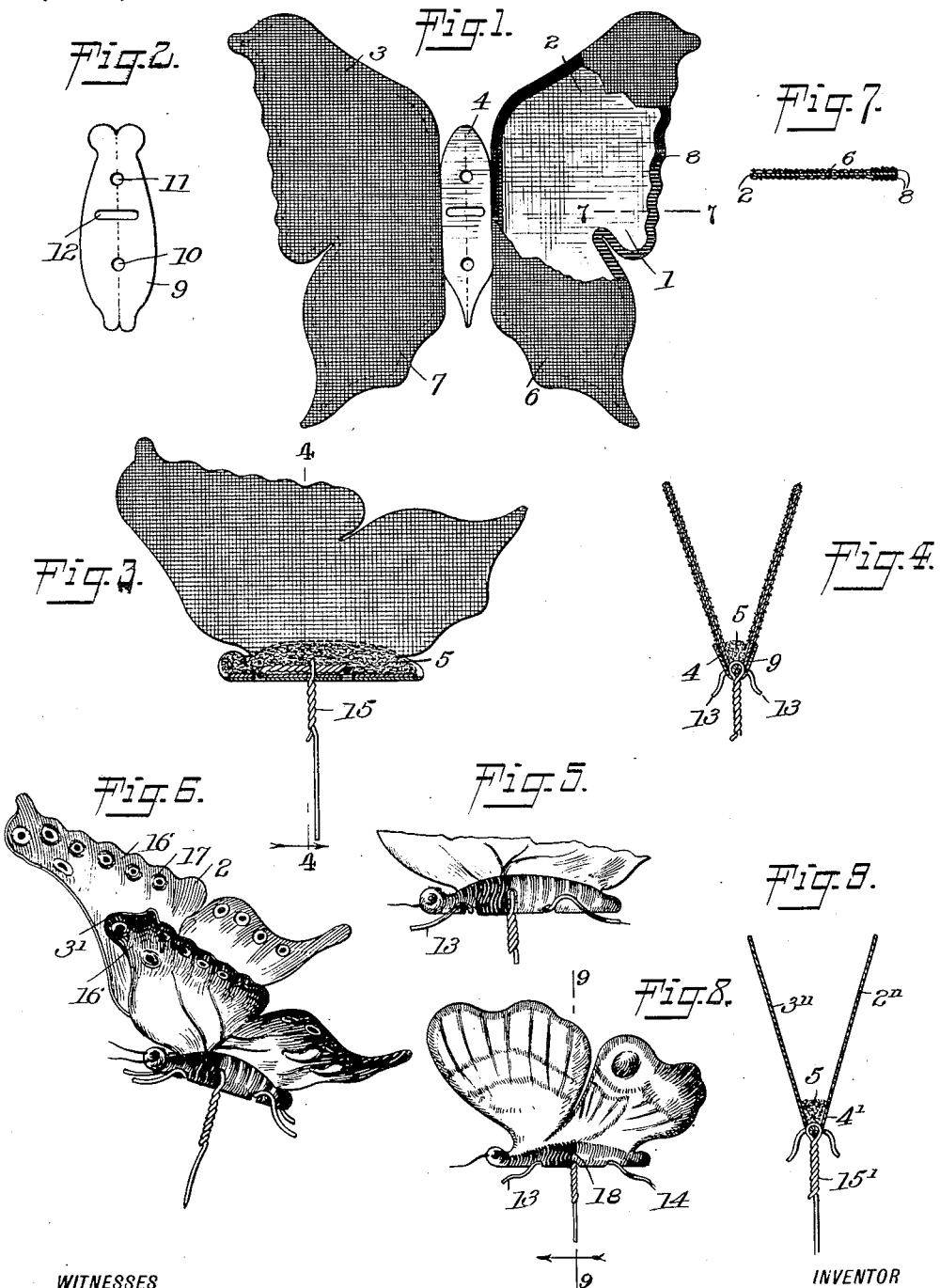

FRANK SHELINE, OF NEW KENSINGTON, PENNSYLVANIA.

ARTIFICIAL BUTTERFLY.

1,077,100.  Specification of Letters Patent. Patented Oct. 28, 1913.

Application filed April 30, 1913. Serial No. 764,570.

*To all whom it may concern:*

Be it known that I, FRANK SHELINE, a citizen of the United States, and a resident of New Kensington, in the county of Westmoreland and State of Pennsylvania, have invented a new and Improved Artificial Butterfly, of which the following is a full, clear, and exact description.

This invention relates to improvements in artificial butterflies, and has for an object to provide an improved construction in which a butterfly may be caused to take substantially any pose and be readily secured in place whenever desired.

Another object of the invention is to form artificial butterflies of various colored cloth or other material, so as to match with different surroundings.

A still further object of the invention is to provide a butterfly formed with a base of any desired material, having connected with the body thereof suitable securing means adapted to receive on the wings and body a coating of paint, cloth, paper, or other substance for giving a proper representation of the usual colors of a butterfly.

In carrying out the objects of the invention various forms of butterflies may be made, all of which will include the idea of forming the butterfly from a base made from any desired material, as for instance celluloid. This base is formed with wings and a body, the wings being designed to receive paint, cloth, or other matter for ornamenting the same, and the body is adapted to receive a securing member, with which is associated projections which act as legs for the butterfly. It is also designed to have a filling for the body which may be colored to correspond with the wings.

A practical embodiment of the invention is represented in the accompanying drawings forming a part of this specification, in which similar characters of reference indicate corresponding parts in all the views.

Figure 1 is a top plan view of the base from which the butterfly is formed, the wings being shown covered; Fig. 2 is a blank of a metallic covering for the body of the base; Fig. 3 is a longitudinal vertical section through a butterfly formed according to the present invention; Fig. 4 is a section through Fig. 3 on the line 4—4; Fig. 5 is a side view of the structure shown in Fig. 4, the upper part of the wings being broken away; Fig. 6 is a perspective view of a butterfly provided with a coating of paint or coloring matter; Fig. 7 is an enlarged fragmentary sectional view through Fig. 1, on the line 7—7; Fig. 8 is a side view of a slightly modified form of the invention in which the metallic covering of Fig. 2 is omitted; and Fig. 9 is a section through Fig. 8 on the line 9—9.

Referring to the accompanying drawings by numerals, 1 indicates a blank formed of any desired material, as for instance celluloid. The blank 1 is stamped out so as to provide a pair of wings 2 and 3, and a central body 4, all of one piece. The central body 4 is bent, as shown in Figs. 3 and 4, in order that the wings 2 and 3 may be partially closed. After the body 4 has been bent as shown in Fig. 4, a filling 5 (Fig. 3) is arranged therein which may be stained or colored for corresponding with the coverings 6 and 7 on wings 2 and 3. In connection with the coverings 6 and 7, the same may be made of any kind of material, as for instance cloth, which is held in place by an adhesive, or in any other desired manner. Preferably a strip of rubber 8 is connected to the opposite sides of the edges of the wings and the fabric is cemented thereto. If desired, a little heat could be applied, which would cause the rubber to more strongly adhere to the celluloid, and also more strongly adhere to the fabric or cloth covering. After the body 4 has been bent up as shown in Figs. 3 and 4, a metallic covering base member 9 is placed thereover. The metallic base covering 9 is provided with apertures 10 and 11, and a central slot 12, through which the legs 13 and 14 project. The slot 12 is designed to accommodate a central mounting or securing wire 15. It will be, of course, evident that the body 4 is provided with apertures and a slot for accommodating the legs and securing member 15, these apertures and slots being clearly disclosed in Fig. 1. After the member 9 has been placed in position the same may be covered with cloth or painted, as desired so as to properly conform to the color of the wings. It will also be evident that the coverings 6 and 7 may be arranged so that one color will appear on the upper surface of the wings, and another color will appear on the lower surface of the wings.

Fig. 6 discloses a slightly modified form of the invention to that shown in Figs. 1 to 5 inclusive, the modification residing in the fact that the wings 2′ and 3′ are covered with a coating of paint 16 which may have ornamentations 17 arranged thereon, as desired.

Figs. 8 and 9 disclose a further modified form of the invention in which the wings 2″ and 3″ are painted and the body 4″ is covered with a coating of paint 18 so as to resemble the usual body of a butterfly. In this form of the invention the wings and body are formed from a single piece. Arranged in the body is a filling 5 similar to the arrangement in the preferred structure. Also connected with the body is a supporting wire 15′ and legs 13 and 14 which project into suitable apertures in the body.

The butterfly after having been formed may be used for any desired purpose, as trimmings, advertising matter, or as amusements. The use of paint for the wings will allow the butterflies to be colored so as to properly harmonize with surrounding ornamentations and other surrounding objects. Certain formed wings have been shown on the drawings, but it will be evident that butterflies having various shaped wings could be made without departing from the spirit of the invention. It will also be evident that the wings or body could be woven or knit if desired, so as to present substantially the same shape and configuration as those above described in detail. The painting or coloring of the wings could be by hand or might be done by lithographing, or otherwise, according to the desire of the operator.

Having thus described my invention, I claim as new and desire to secure by Letters Patent:—

1. In an artificial butterfly, a celluloid blank formed in the shape of a butterfly body and a pair of wings, color material arranged on said wings, and a wire bent so as to provide legs and a securing or mounting member said wire being interlocked with said body.

2. An artificial butterfly formed from a base having a body and a pair of wings all in one piece, said body being bent substantially centrally, a filling substance arranged in said body, a member arranged in said body beneath said filling substance formed with projecting members extending through said body for producing legs, and a mounting or securing member connected with said member.

3. An artificial butterfly comprising a body, a pair of wings, a covering on the upper surface of said wings, a covering on the lower surface of said wings, a pair of bent wires having the opposite ends extending through said body and slightly diverging for producing legs, and means engaging said bent wire and constituting a securing or mounting member.

4. An artificial butterfly comprising a body, a pair of wings, a border of rubber arranged on said wings on the upper and lower surfaces thereof, a covering for the upper and lower surfaces of said wings engaging said rubber and secured thereby to said wings, and a wire entwined with said body formed with projections constituting legs.

5. An artificial butterfly comprising a body, a pair of wings, said body being bent substantially centrally for forming a substantially trough-shaped structure, a colored granular substance arranged in said trough-shaped structure, and a member arranged in said body with projecting ends which act as legs for the butterfly.

6. An artificial butterfly comprising a pair of wings, a body connected therewith, a metallic covering member for said body formed of substantially the same shape as said body, a twisted wire arranged so that the two forward ends and two rear ends will project through said body and body covering in a diverging manner for producing front and rear legs, and a securing member connected with said wire extending through said body and said covering.

In testimony whereof I have signed my name to this specification in the presence of two subscribing witnesses.

FRANK SHELINE.

Witnesses:
LEONARD LEWIS,
JOSEPH LENGEL.